(12) United States Patent
Yamamoto et al.

(10) Patent No.: US 6,650,615 B1
(45) Date of Patent: Nov. 18, 2003

(54) OPTICAL RECORDING MEDIUM AND RECORDING AND/OR REPRODUCING METHOD AND APPARATUS EMPLOYING THE OPTICAL RECORDING MEDIUM

(75) Inventors: Masanobu Yamamoto, Kanagawa (JP); Akio Yasuda, Fellbach (DE); Yuichi Sabi, Tokyo (JP)

(73) Assignees: Sony Corporation, Tokyo (JP); Sony International (Europe) GmbH, Berlin (DE)

( * ) Notice: Subject to any disclaimer, the term of this patent is extended or adjusted under 35 U.S.C. 154(b) by 159 days.

(21) Appl. No.: 09/598,305

(22) Filed: Jun. 21, 2000

(30) Foreign Application Priority Data

Jun. 23, 1999 (JP) .......................................... P11-177195

(51) Int. Cl.$^7$ ................................................ G11B 7/24
(52) U.S. Cl. ................................ 369/275.1; 369/13.35; 369/13.29; 369/284
(58) Field of Search ................................. 369/100, 103, 369/13.4, 13.35, 13.53, 13.31, 275.1, 59.18, 284, 281, 13.29, 110.01, 124.03; 430/20, 945, 19, 270.14, 270.15; 428/913, 1.3, 64.2, 64.3; 349/22, 172, 183, 187, 184, 193; 365/108, 120, 121

(56) References Cited

U.S. PATENT DOCUMENTS

| | | | | |
|---|---|---|---|---|
| 4,551,819 A | * | 11/1985 | Michl et al. ................. 365/120 |
| 4,686,169 A | * | 8/1987 | Yoshino et al. ......... 430/270.15 |
| 4,995,705 A | * | 2/1991 | Yoshinaga et al. ............. 349/22 |
| 5,019,476 A | * | 5/1991 | Kanno et al. ............. 346/135.1 |
| 5,097,463 A | * | 3/1992 | Wagenblast et al. ... 369/110.01 |
| 5,124,183 A | * | 6/1992 | Nakano et al. .......... 346/135.1 |
| 5,141,785 A | * | 8/1992 | Yoshinada et al. ....... 346/135.1 |
| 5,251,197 A | * | 10/1993 | Leube et al. ........... 369/110.01 |
| 5,272,552 A | * | 12/1993 | Yoshinaga et al. .......... 349/172 |
| 5,384,221 A | * | 1/1995 | Savant et al. ................ 365/120 |
| 5,751,670 A | * | 5/1998 | Fukushima ................ 369/13.4 |
| 5,796,692 A | * | 8/1998 | Hosoya .................... 369/59.18 |
| 6,090,508 A | * | 7/2000 | Tsutsui et al. ................ 349/22 |
| 6,445,676 B1 | * | 9/2002 | Fujii et al. .................. 369/281 |

FOREIGN PATENT DOCUMENTS

| | | | |
|---|---|---|---|
| JP | 64-067727 | * | 3/1989 |
| JP | 4-336284 | * | 11/1992 |

* cited by examiner

*Primary Examiner*—William Korzuch
*Assistant Examiner*—Kim-Kwok Chu
(74) *Attorney, Agent, or Firm*—Sonnenschein, Nath & Rosenthal LLP (57) ABSTRACT

An optical recording medium is capable of linear recording in a photon mode. An organic material changed in molecular orientation on light illumination to exhibit birefringence is used as a recording material. For example, a recording layer having, as a recording material, an organic material changed in molecular orientation caused by trans-cis rearrangement, is changed in birefringence with changes in the molecular orientation of the organic material. The recording system which utilizes the changes in the molecular orientation of the organic material has linear characteristics and gives outputs different depending on e.g., the degree or the angle of orientation, thus enabling multi-valued recording.

7 Claims, 5 Drawing Sheets

OPTICAL RECORDING MEDIUM AND RECORDING AND/OR REPRODUCING METHOD AND APPARATUS EMPLOYING THE OPTICAL RECORDING MEDIUM

RELATED APPLICATION DATA

The present application claims priority to Japanese Application No. P11-177195 filed Jun. 23, 1999 which application is incorporated herein by reference to the extent permitted by law.

BACKGROUND OF THE INVENTION

1. Field of the Invention

This invention relates to a novel optical recording medium for recording and/or reproducing information signals by exploiting changes in birefringence caused by changes in molecular orientation of an organic material. This invention also relates to a recording and/or reproducing method and an apparatus employing this optical recording medium.

2. Description of Related Art

Up to now, phase difference modulation by pits or crests/recesses of a dyestuff material, reflectance difference modulation between the amorphous and crystal phases, as in case of a phase change recording film, or detection of polarization by the photo-magnetic Kerr effect, has been known as a recording and/or reproducing principle for an optical disc.

The recording system in a recordable optical disc is thermal recording, the basic concept of which is that changes in the status of a recording film are caused at a certain threshold temperature to record the changes. The recording and/or reproducing signals in this case are non-linear and hence are suited for recording digital binary signals.

There is also known an optical recording system employing a photochromic material, known as a photon mode. This system has a number of drawbacks in storage stability following the recording, readout stability and in durability against repeated use, such that a solution which overcomes all of these problems has not been found to date.

Meanwhile, the recent tendency in the field of optical recording is towards a shorter wavelength of a light source and a higher numerical aperture (NA) of an objective lens. Thus, it has been reported that, by combining a blue purple light source and an objective lens with a numerical aperture NA=0.85, a recording capacity as large as 20 GB can be realized with an optical disc having a diameter of 12 cm. This, however, may be said to indicate that the recording and/or reproduction by a so-called far-field optical system is approaching to its theoretical limit.

Among the methods to overcome this limitation is a method of using a recording material capable of linear recording and/or reproduction to realize multi-values recording.

However, the thermal recording, which has so far been customary, is a non-linear recording system, such that it is difficult to realize multi-valued recording.

In this consideration, the recording material of the thermal recording system, such as a metal-based material used as a phase-change recording material or a photomagnetic recording material, may not be said to be desirable.

SUMMARY OF THE INVENTION

It is therefore an object of the present invention to provide a novel optical recording medium capable of achieving linear recording and/or reproduction and a recording and/or reproducing method and apparatus employing this novel optical recording medium.

For accomplishing the above object, the present inventors have conducted various researches for long, and have reached a conclusion that a novel optical recording system can be constructed by employing, as a recording material, an organic material which has its molecular orientation changed on light illumination to exhibit birefringence.

The present invention, completed on the basis of this finding, provides an optical recording medium having a recording layer including an organic material having its molecular orientation changed on illumination of polarized light.

The present invention also provides a recording and/or reproducing method including illuminating polarized light to a recording layer including an organic material as a recording material to change its molecular orientation to record information signals and reading out changes in birefringence caused by changes in molecular orientation as changes in the polarized state of the incident light.

The present invention also provides a recording and/or reproducing apparatus employing, as a recording medium, an optical recording medium including a recording layer containing an organic material having its molecular orientation changed on illumination of polarized light. The apparatus includes a recording optical system for illuminating pre-set polarized light as recording light on said recording layer, and a reproducing optical system for detecting the polarized state of the playback light incident on said recording layer.

As described above, the basic concept of the present invention is that such an organic material changed in molecular orientation on light illumination to exhibit birefringence is used as a recording material.

The recording system exploiting the changes in molecular orientation in the organic material exhibits linearity, such that different outputs are obtained depending on the degree or angle of orientation, thus enabling multi-valued recording.

According to the present invention, it becomes possible to construct an optical recording system which is totally different from the conventional system.

As meritorious effects of the present invention, the playback signals larger than those with a magneto-optical disc can be produced, while signals proportionate to the volume of illuminated light can be achieved, thus assuring linear recording and/or reproduction and high density recording by combination with e.g., multi-valued recording. The high quality transcription recording and erasure becomes possible with an organic material. Since the organic material can be prepared by coating by a spinning method, manufacturing cost can be reduced appreciably. Moreover, the signal level can be changed to meet system requirements by selecting the combination of the direction of orientation of the recording film and the direction of polarization relative to the track direction. In addition, readout and writing can be performed using the same wavelength by changing the direction of polarization.

DESCRIPTION OF THE PREFERRED EMBODIMENTS

Referring to the drawings, preferred embodiments of an optical recording medium, a recording and/or reproducing system and a recording and/or reproducing apparatus of the present invention will be explained in detail.

First, the recording and/or reproducing principle in the present invention is explained.

There has so far been known a material which, when irradiated with light, is changed in molecular orientation to exhibit birefringence.

For example, when irradiated with a polarized ultra-violet light, a liquid crystal material, obtained on silylating an azobenzene derivative, transfers from the homeotropic orientation in which the molecular axis is arrayed in a direction perpendicular to the substrate surface to a homogeneous orientation in which the molecular axis is arrayed parallel to the substrate surface, thus exhibiting birefringence. This is termed out-of-plane orientation.

A methacrylate polymer, having azobenzene in its side chain, has the liquid crystal site oriented parallel to the substrate, and is termed a side-on type. When irradiated with the linearly polarized visible light, this material has its molecules rotated at right angles to the direction of polarization, by the electrical field of light, such that, statistically, the material similarly exhibits birefringence, with the direction of homogeneous orientation being changed.

In these materials, isomerization of azobenzene to trans- and cis-forms is induced by light.

Figure 1:
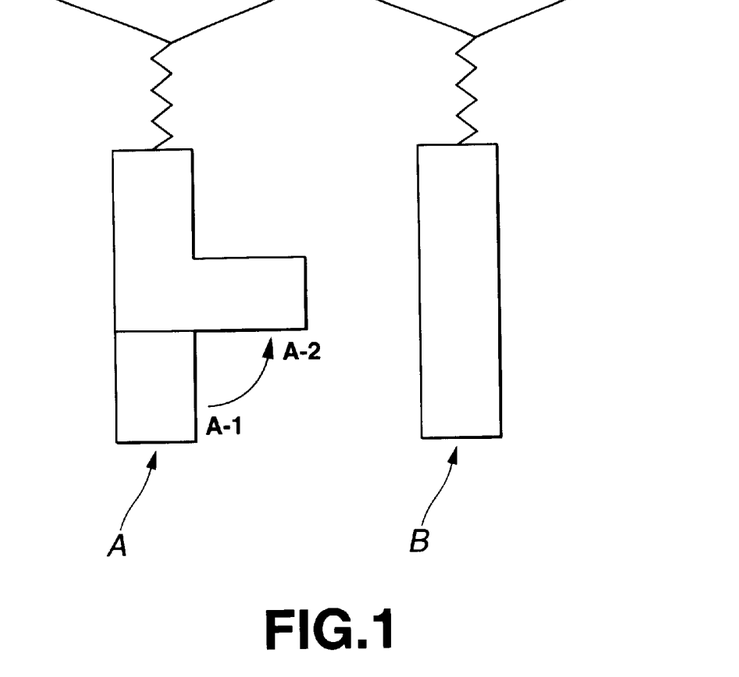
FIG. 1 is a schematic view for illustrating the state of trans-cis rearrangement.

FIG. 1 schematically shows the isomerization reaction to trans- and cis-forms. Here, an organic material having a side chain (chromophore) exhibiting light activity and a side chain (mesogen) B exhibiting light stability is taken as an example.

The chromophore A and the mesogen B are side chains each having an azobenzene portion and are of chemical structures shown for example in the following chemical formulas 1 and 2:

[chemical formula 1]

[chemical formula 2]

In the above isomerization reactions, the chromophore A on irradiation with linearly polarized light undergoes an isomerization reaction from trans-form A-1 to a cis-form A-2. It is noted that, with azobenzene, the trans-form A-1 is in the stable state and, when irradiated with linearly polarized light, undergoes a trans-cis isomerization reaction, after which it reverts to its trans-form.

Although it may be envisaged to use changes in the absorption spectrum caused by cis-trans isomerization for recording, difficulties are met in realization of a practical optical recording medium because of problems encountered in stability in the recording state and reversibility.

Thus, the present invention uses birefringence, accompanying the changes in the molecular orientation, for recording and/or reproduction.

The orientation of the azobenzene derivative by light and the mechanism of the accompanying changes in birefringence, are hereinafter explained.

First, prior to light incidence, the trans-form of azobenzene is thermally more stable. Thus, the trans-form is dominant. Moreover, since the trans-form is smaller in free volume, is less susceptible to rotation and is more stable. This means that, if used for light recording, azobenzene is higher in readout stability.

If light is incident on azobenzene, the photo-isomerization reaction is induced, so that azo-benzene undergoes orientation by the electrical field of light.

Specifically, when the polarized light having a component of the electrical field parallel to the azobenzene molecule, azobenzene absorbs light to undergo transformation to a cis-form. This state is unstable such that azobenzene instantly reverts to the trans-form. However, if light is incident continuously, further excitation occurs such that resonance is produced to maintain the state of the cis-form. When in the cis-form, the free volume is changed and susceptible to rotation. On the other hand, since azobenzene does not react to an electrical field component perpendicular to its molecule, the state in which the molecule is oriented in a direction perpendicular to the incident linearly polarized light ultimately represents the stable state. Thus, azobenzene is oriented to this state.

Since the oriented azobenzene molecule exhibits the properties of a liquid crystal, it exhibits strong birefringence in a direction along the molecular axis. Thus, significant changes in refractive index are produced due to the difference in the state of orientation.

Meanwhile, if a side chain (mesogen) is introduced into the high molecular material, with a view to stabilizing the azobenzene (chromophore) inducing the photo-isomerization reaction, azobenzene (chromophore) is improved in stability. Mesogen is bonded to azobenzene, which is chromophore, and is moved therewith and oriented similarly to chromophore to stabilize it. It is noted that stability in the oriented state is significantly higher than that of the conventional photochromic material.

The present invention utilizes this principle as the principle of recording and/or reproduction of the optical recording medium.

Figure 2:
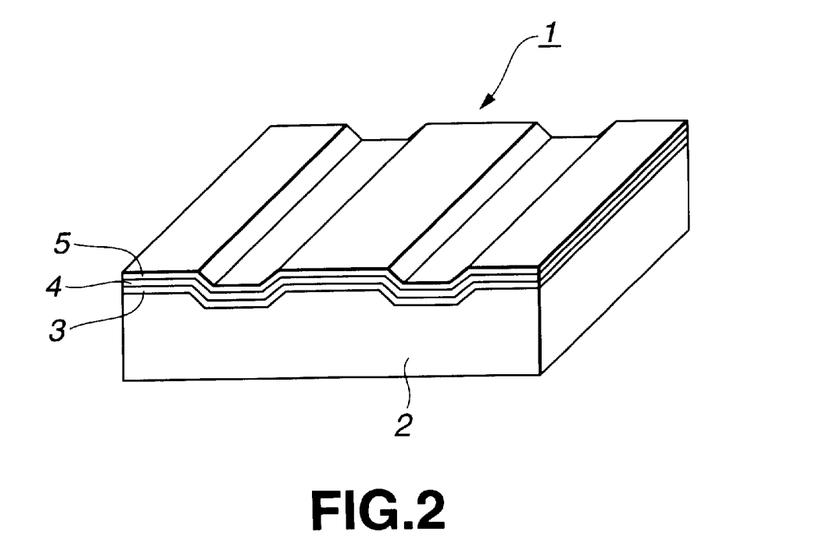
FIG. 2 is a schematic perspective view showing an illustrative structure of an optical disc embodying the present invention.

FIG. 2 shows an illustrative structure of an optical disc exploiting the above-mentioned recording and/or reproducing principle.

This optical disc is irradiated with the recording light or the reproducing light from the side of the substrate 2 for recording and/or reproduction. In this optical disc 1, a layer of a recording material 3, a reflective layer 4 and a protective layer 5 are sequentially formed on a substrate 2.

The substrate 2 is formed by injection molding such materials as polycarbonate (PC) or amorphous polyolefin (APO) and a guide groove for tracking or pits such as address pits are formed on its surface.

As an alternative method for fabricating a substrate having guide grooves or pits, a so-called 2P method may be used. The aforementioned patterns may be formed by UV light curable resin on a flat substrate, such as a glass substrate.

For forming the layer of a recording material 3, a recording material, dissolved in an organic solvent, is supplied dropwise to the substrate 2. Usually, the recording material is spun off at an elevated speed by a spin coating method so as to be uniformly coated on a signal area of the substrate 2. If the organic solvent in which is dissolved the recording material affects the substrate 2, the substrate surface may be surface-processed, prior to the spinning process, by a material insoluble in the organic solvent.

The recording material is such an organic material which, if irradiated with light, undergoes changes in its molecular orientation to exhibit birefringence. For example, such a high molecular material which exhibits liquid crystal properties and in which an azobenzene derivative has been introduced in the side chains as chromophore and mesogen.

The solvent is dried off and subsequently the reflective layer 4 is formed on vapor deposition or sputtering. For ultimately forming the optical disc, the protective layer 5 formed e.g., of a UV light curable resin is coated to protect the reflective layer 4 from e.g., oxidation.

The coating thickness is set based on the following concept:

That is, if the birefringence in the completely oriented state of the recording material is $\Delta n$, the maximum modulation factor is achieved when $\Delta n \times$(thickness t of the layer of a recording material)=$\lambda$(wavelength of the reproducing light)/4, where $\Delta n = n_e - n_o$, $n_e$ and $n_o$ being the refractive index for the extraordinary light and the refractive index for the ordinary light, respectively. This value, however, does not take multiple interference between the reflective layer 4 and the substrate 2 into account, so that, in reality, the modulation factor becomes maximum for the film thickness slightly deviated from the above value. On the other hand, in a system for detecting the transmitted light, where a detection optical system is arranged facing each other with the optical disc in-between, the modulation factor becomes maximum for the film thickness of $\lambda/2\Delta n$. Therefore, it suffices if the thickness of the layer of a recording material 3 is not larger than $\lambda/2\Delta n$. However, since recording is not possible with the film thickness equal to zero, the thickness t of the layer of the recording material 3 is deniably such that $0 < t \leq \lambda/2\Delta n$.

If the recording and/or reproduction is considered, the recording and/or reproducing optical system differs depending on whether the state of orientation prior to recording of the layer of a recording material 3 is allowed to be random or is set to a uniformly oriented state along a circumferentially arranged guide groove.

Figure 3:
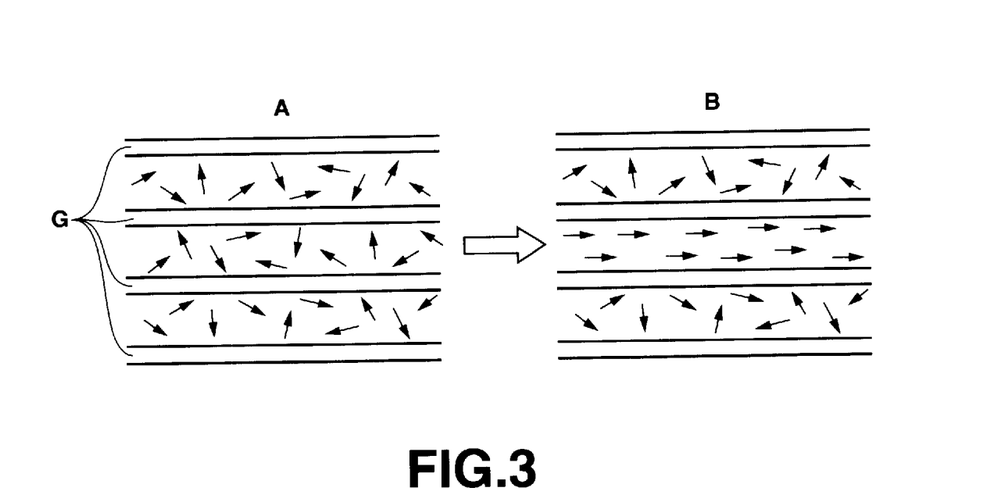
FIG. 3 is a schematic plan view showing an initial state (random state) and the oriented state.

Referring to FIG. 3, the molecular orientation directly after coating, as indicated by arrow, is not constant but is random (FIG. 3A). If conversely the linearly polarized light is illuminated only on the middle track (planar area defined between neighboring grooved G), the molecules are oriented in the track direction (FIG. 3B). It is noted that an intermediate state persists until complete orientation is achieved, and that this state can be controlled in its level by the variable volume of the irradiated light. In this intermediate state, the birefringence by isomerization $\Delta n$ also assumes an intermediate value, such that the signal output assumes a corresponding intermediate value, thus realizing multi-valued recording.

For the state of orientation, used for recording, a variety of combination can be used. For example, such a modulation system in which the random state (non-oriented state) is 0 and the completely oriented state is 1 or a system in which the angle of orientation is modulated as the completely oriented state is kept.

For multi-valued recording, there may be used two systems, namely a system of modulating the orientation degree and a system of changing the angle of orientation with the orientation degree remaining unchanged.

A variety of different optical systems need to be used depending on these recording systems.

Thus, the structure of the optical system in the recording and/or reproducing apparatus embodying the present invention is hereinafter explained.

Figure 4:
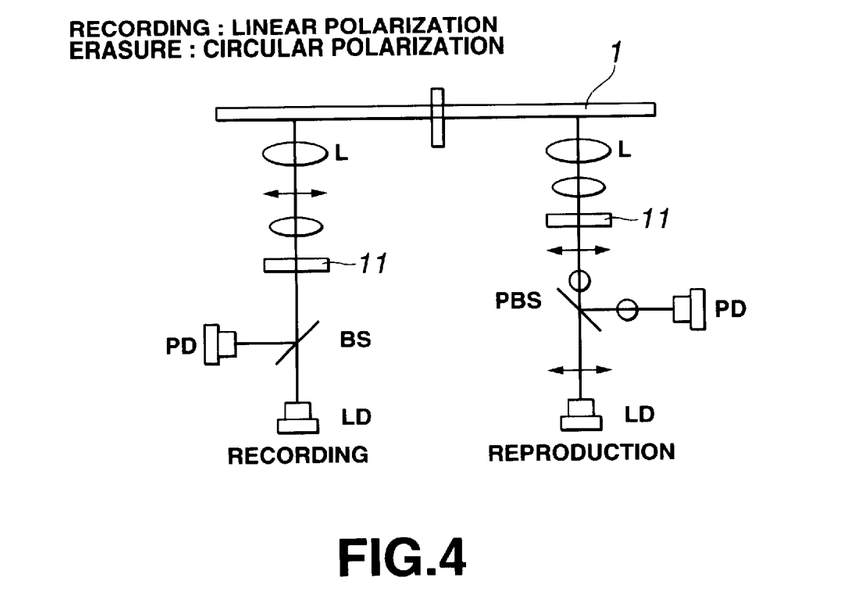
FIG. 4 is a schematic view showing an example of a recording and/or reproducing optical system.
Figure 5:
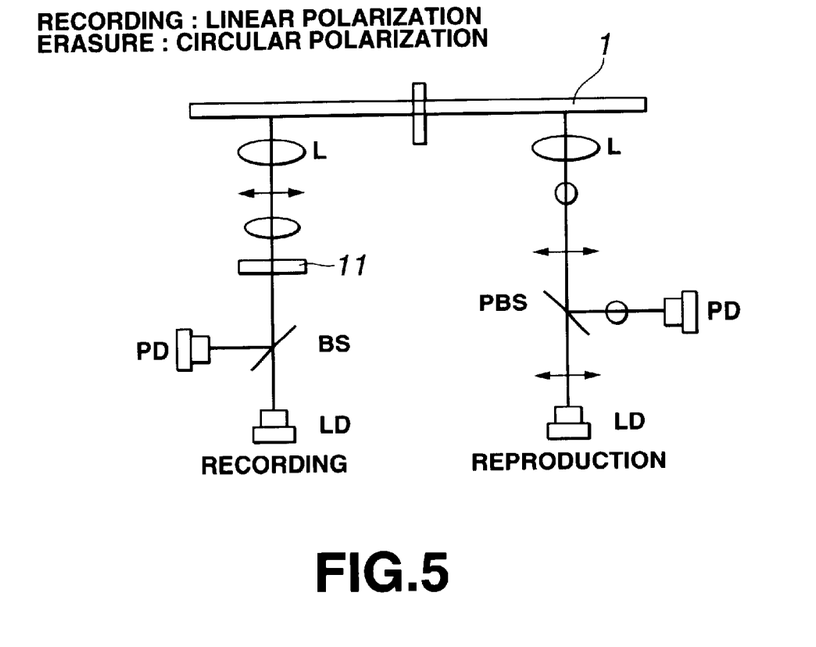
FIG. 5 is a schematic view showing another example of a recording and/or reproducing optical system.
Figure 6:
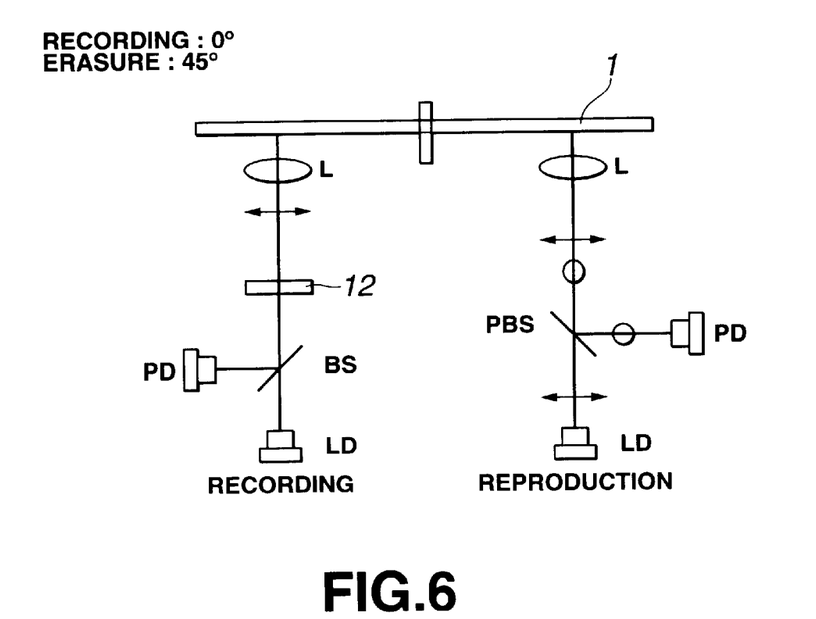
FIG. 6 is a is a schematic view showing still another example of a recording and/or reproducing optical system.

FIGS. 4 to 6 show illustrative structures of a basic optical system. These optical systems basically have many points in common with the optical system for a CD or a DVD. That is, the light from a laser diode LD is converted by a collimator into a parallel light beam which then falls on an objective lens L via a beam splitter BS. The light transmitted through a transparent substrate of the optical disc 1 and reflected by the signal surface is reflected by the beam splitter BS to fall on a photodetector PD for focussing detection by an astigmatic method. The photodetector PD basically detects HF signals, focussing error signals or tracking error signals. The optical system differs from the optical system for CDs or DVDs as to the polarization light system for detecting the birefringence.

Specifically, the optical system shown information FIG. 4 is used for detecting the difference in the signal volume in the random state and that in the oriented state. A λ/4 plate 11 is inserted to achieve the maximum modulation factor, and circularly polarized light is illuminated on the optical disc 1 in signal reproduction. The maximum modulation factor is achieved when the film thickness of the layer of a recording material 3 is set so that, when the playback light is reflected by the optical disc, the phase difference between the respective axes of birefringence is equal to π. If the layer of a recording material is oriented in such case, the optical disc operates as a λ/4 plate+reflective film.

If, in this configuration, the molecular orientation in the light spot is random, the optical disc 1 operates simply as a reflective film, so that the reflected light is reflected as the circularly polarized light as before. When the light traverses the λ/4 plate again, it is in a state of linearly polarized light perpendicular to the incident light and is reflected by the signal detecting photodetector PD. If the molecules in the light spot are oriented, the optical disc operates as λ/4 plate+reflective film, so that the reflected light is circularly polarized light having the opposite direction to that of the incident light and, when the light again traverses the λ/4 plate 11, it is the linearly polarized light of the same direction as that of the incident light and is unable to reach the signal detecting photodetector. Although the angle of orientation is arbitrary, the angle needs to be unified in the optical disc. In case of a film structure in which the birefringence of the optical disc gives a phase smaller than π, for example, in case of a thin film thickness of the layer of a recording material, the polarized light after again traversing the λ/4 plate 11 is the elliptically or circularly polarized light, with the result that the volume of light re-incident on the photodetector is decreased. The same holds if the orientation is in the intermediate state. However, in such case, the detection light volume can be modulated in plural stages to realize multi-valued recording.

The recording and erasure are performed as follows: Since the initial state is the random state, this state is assumed to be an erasure state. In recording, linearly polarized light is illuminated to orient the molecules of the layer of a recording material. For re-erasure, the random orientation can be realized by causing the circularly polarized light to be incident. Therefore, the optical system is designed so that linearly polarized light and the circularly polarized light may be caused to be incident as shown in FIG. 4. If, in the optical system, shown in FIG. 4, the λ/4 plate 11 is inserted, or dismounted, and a modulation element matched to it and having the same function is used for high-speed modulation to the linearly or circularly polarized light, overwriting becomes possible. The modulation element used may be such an element which, through use of e.g., a liquid crystal device, is able to vary the phase of light electrically.

In FIG. 4, the optical system for the recording optical system shown separately from that for the reproducing system. However, in actuality, the same optical pickup may be used in common for the recording and reproducing systems. For example, even if the recording light wavelength differs from the reproducing light wavelength, it is possible to effect recording and/or reproduction by the sole optical pickup by guiding two light beams by a laser coupler to the same light path and by associating each optical component with two wavelengths.

The laser used for recording and/or reproduction may be of a wavelength of 400 to 780 nm. For example, the recording laser can be a short wavelength laser, such as a GaN semiconductor laser, which can be designed with the wavelength of 400 nm. The reproducing laser can be a long wavelength laser, such as a GaAs semiconductor laser, with a wavelength of 650 nm or 780 nm, now being used in DVDs or CDs.

The light wavelength can be suitably selected in meeting with wavelength characteristics of the layer of a recording material. In this case, the wavelength with less absorption is preferably used for reproduction, whereas recording is in need of absorption to a certain extent. In making recording and/or reproduction with the same wavelength, the absorption coefficients at the wavelength used can be selected suitably to change the light intensity in recording and/or reproduction.

If the optical modulation system in which erasure and recording correspond to the random and oriented states, respectively, the reproducing optical system can be constructed as shown in FIG. 5.

The optical system shown in FIG. 5 corresponds to the optical system of FIG. 4 less the λ/4 plate 11. The optical disc 1 is irradiated with linearly polarized light.

In this case, the direction of orientation for recording is tilted 45° relative to the polarization plane for playback. That is, the polarization plane for recording is rotated 45° relative to the polarization plane for playback.

By this setting, the polarization plane of the reproducing light is not rotated in the erased state at the time of reflection and hence does not reach the photodetector. In the recording state, since the optical disc 1 is equivalent to the λ/4 plate plus reflecting surface, the polarization plane is rotated 90°. Therefore, the reflected light is introduced into the photodetector PD for detection thereby.

In this case, the same optical pickup may be used for recording and reproduction. In this case, however, it is necessary to use a modulation element having a mechanism for rotating the polarization plane and a mechanism for converting the linear polarization to the circular polarization. Such an element may be used which is able to change the phase of light electrically by using a liquid crystal as in the above-described example.

The multi-valued recording can be realized by changing the degree of orientation, as in the case of FIG. 4. The multi-valued recording can also be realized by setting the angle of orientation to an intermediate angle between 0° and 45° relative to the polarization plane of the reproducing light, with the degree of orientation remaining the same. In case of the intermediate angle, the polarized light is the elliptically or circularly polarized light, with the amount of the detected light being in the intermediate state by the polarized light traversing the polarization beam splitter PBS. That is, the multi-valued recording can be realized by using several stages of the angle of orientation. It is noted that the degree of orientation and the angle of orientation can be changed simultaneously.

FIG. 6 shows an example of the optical system in which both recording and reproduction are achieved in the completely oriented state. The maximum modulation can be achieved by setting the angle of orientation in the erasure state to 0° and that in the recording state relative to the polarization plane for reproducing light to 0° and to 45°, respectively. That is, if the direction of orientation is 0° with respect to the polarization plane of the reproducing light, the polarization of the detection light is the same as that of the incident light and hence the light does not reach the photodetector PD. If the direction of orientation is 45° with respect to the polarization plane of the reproducing light, the optical disc operates as the $\lambda/4$ plate plus reflecting film. So, the polarization plane of the detection light is rotated 90° relative to the polarization plane of the reproducing light and is incident in its entirety on the photodetector PD. If the degree of orientation is intermediate between 0° and 45°, the detection light is the elliptically or circularly polarized light, respectively, as in the case of the optical system shown in FIG. 5, so that an intermediate output is acquired to realize the multi-valued recording.

In the optical system, shown in FIG. 6, linearly polarized light is used for recording and erasure. Specifically, the recording and erasure are realized using an element which rotates its polarization plane. Although a $\lambda/2$ plate 12 is used in the present example, overwriting can be realized by employing a high-speed modulation element, as in the case of the optical system shown in FIGS. 4 and 5.

The optical system may also be configured as follows:

In the optical systems, shown in FIGS. 4 to 6, the maximum modulation is achieved when the optical disc operates as a $\lambda/4$ plate plus reflective film, inclusive of the effect of multiple reflection. However, if desired to reduce the thickness of the layer of a recording material, the birefringence $\Delta n$ needs to be increased. Conversely, with the small value of the birefringence $\Delta n$, the film thickness of the layer of a recording material when the optical disc is to be equivalent to the $\lambda/4$ plate plus reflective film is thicker such that it is occasionally thicker than the depth of focus.

In order to realize sufficient modulation factor despite the reduced thickness of the layer of a recording material, the following optical system may be used.

First, the optical disc 1 is set to operate as a the $\lambda/8$ plate plus reflective film. This can be realized by a film thickness one-half of that when the optical disc operates as the $\lambda/4$ plate plus reflective film.

The recording and erasure completely orients molecules to modulate the angle of orientation, as in the case shown in FIG. 6. However, in this case, the angle of orientation is modulated with 0 to 90°.

Figure 7:
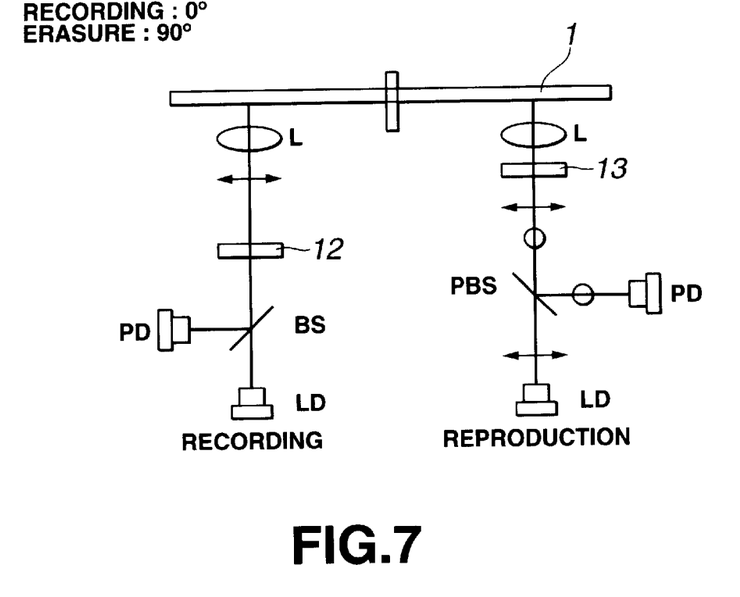
FIG. 7 is a schematic view showing yet another example of a recording and/or reproducing optical system.

In the detection optical system, the $\lambda/8$ plate 13 is set, with its axis aligned with the axis of orientation, as shown in FIG. 7.

By this setting, if the orientation is 90°, and the $\lambda/8$ plate 13 is adjusted, the objective lens is equivalent to a $\lambda/8$ plate+$\lambda/8$ plate+reflective film, with the incident linearly polarized light being rotated 90° to fall on the photodetector PD. If the orientation is 0°, the objective lens is equivalent to a $\lambda/8$ plate−$\lambda/8$ plate+reflective film, such that the function as the reflective film is not displayed, so that the incident linearly polarized light is not rotated nor is incident on the photodetector PD.

In this manner, a signal similar to that of FIG. 6 is obtained. If the angle is intermediate between 0 and 90°, the detection light is at an intermediate level, such that the multi-valued recording is similarly possible.

By the above-described optical disc and the polarization optical system, the recording and/or reproducing system can be constructed in which recording is not the heat mode recording as in the conventional phase change material or a photomagnetic recording material but is the photon mode recording.

As described above, the present invention utilizes the difference in refractive index with the ordinary light and with the extraordinary light in a birefringent organic thin film (layer of a recording material) for signal detection and, as indicated in the specified example of a detection optical system, the maximum modulation factor is obtained when the phase of the reflected light is deviated by $\pi$ or $\pi/2$ relative to the incident light axis of the ordinary light and that of the extraordinary light, corresponding to the cases of the objective lens operating as the $\lambda/4$ plate plus reflective film and as the $\lambda/8$ plate plus reflective film, respectively. This is achieved when the reflective film is provided adjacent to the organic thin film having a film thickness of $\lambda/4\Delta n$ and $\lambda/8\Delta$. However, if birefringence persists, the refractive index differs significantly, so that the effect of multiple interference differs with the ordinary light and with the extraordinary light in case a dielectric film is formed adjacent to the organic thin film.

This may be exploited to provide an optical disc with which the maximum modulation factor may be achieved with a film thickness of a thinner film thickness of the organic thin film.

That is, the effect of multiple interference may be visualized as follows:

First, the incident light is the linearly polarized light, and a polarization plate is arranged in a detection optical system so that its transmission axis of polarization is at right angles to the incident polarization plane (cross-Nicol array) to observe the detection light (refer to the detection optical system of FIG. 5).

Figure 8:
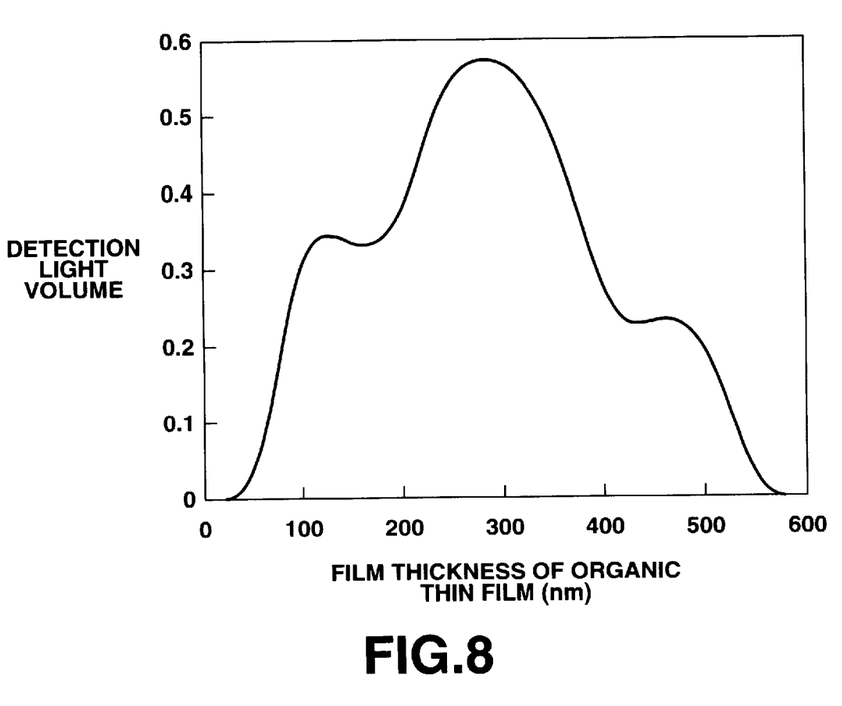
FIG. 8 is a graph for showing the relation between the thickness of an organic thin film and the volume of detection light.

The reflection light volume in case of the configuration of the organic thin film +reflective film, there being not provided a dielectric film, is shown in FIG. 8.

Here, the refractive index of the ordinary light, that of the extraordinary light and the extinction coefficient are set to 1.5, 2.0 and 0.04, respectively, and the film thickness of the organic thin film is plotted on the abscissa to indicate its changes. Meanwhile, the light wavelength is 633 nm.

With the zero film thickness of the organic thin film, there is naturally no phase deviation of the reflected light from the axis of the extraordinary light, so that there lacks the detection light. With increasing film thickness of the organic thin film, the volume of the incident light on the photodetector is increased, becoming maximum for $\lambda/4\Delta n$. Thus, in order to acquire the maximum modulation factor with this configuration, a film thickness of $\lambda/4\Delta n$ is required.

If the birefringence $\Delta n$ is small, it is necessary to increase the film thickness of the organic thin film. However, since the depth of focus of the converged light is limited, there is an upper limit to the film thickness that can be set. Since the recording principle is solely by light irradiation, any heat absorbed by the organic thin film needs to be emitted quickly to the reflective film. If the organic thin film absorbs light, the light is not transmitted through the film of a larger thickness, such that recording can be made only on the light incident side surface.

For these reasons, the organic thin film is, in actuality, as small in film thickness as possible.

For realizing similar modulation factor with a thinner film thickness, it is effective to sandwich the organic thin film with dielectric films. In this case, the refractive index of the substrate is desirably different from that of the dielectric film.

Figure 9:
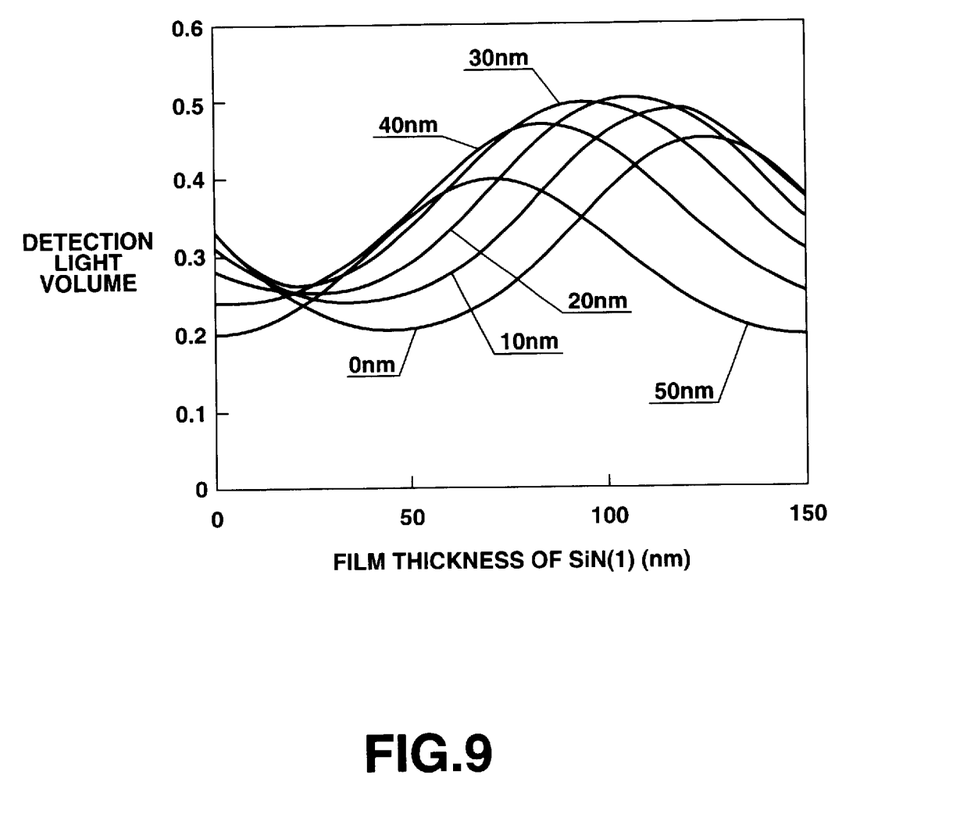
FIG. 9 is a graph for showing the relation between the thickness of a dielectric thin film and the volume of detection light.

FIG. 9 shows changes in the modulation factor in case the film thickness of the dielectric film is changed in an optical disc having the organic thin film with a film thickness of 120 nm.

With this optical disc having the organic thin film with a film thickness of 120 nm, the film thickness is not larger than one-half $\lambda/4\Delta n$.

With the optical parameters of the organic thin film as shown in FIG. 8, SiN (n=2) and glass (n=1.46) were used as the materials of the dielectric film and as the substrate, respectively. The optical disc configuration is such that SiN(1), SiN(2) and a reflective film (Al: 100 nm) are deposited on a substrate in FIG. 9, the numerals entered for respective curves indicate film thicknesses of SiN(2).

It is seen from FIG. 9 that, by properly selecting the film thickness of the SiN film as the dielectric film, it is possible to achieve a large detection light volume.

For example, should there be no SiN(2), only the detection light of 0.34 can be obtained with the organic thin film 120 nm in thickness. Conversely, the detection light of 0.51 is obtained for SiN(1) of 120 nm and SiN(2) of 20 nm. The modulation factor in case the phase deviation equal to $\pi$ occurs between the ordinary light and the extraordinary light is 0.58 as indicated by the film thickness of 300 nm of FIG. 8.

If the organic thin film is 120 nm in film thickness, the phase that can be achieved is not up to but close to $\pi$.

In the case of the optical system of FIG. 7, the maximum modulation factor is achieved with the phase deviation one-half that of the previous example by ingenuously designing the detection optical system. In this case, it is evident that the effect of multiple interference proper to SiN operates effectively, such that the sufficient modulation factor can be realized with a film thickness smaller than $\lambda/8\Delta n$.

What is claimed is:

1. An optical recording medium comprising:
a recording layer including an organic material having its molecular orientation changed on illumination of polarized light;
a substrate on which said recording layer is formed, said substrate having at least one of a guide groove and pits on a side facing to the recording layer;
a first dielectric film formed on said substrate between the substrate and the recording layer;
a second dielectric film formed on said recording layer; and
a reflective film formed on said second dielectric film,
wherein with a birefringence $\Delta n$ of the recording layer when oriented completely and with a wavelength $\lambda$ of a playback light, a thickness t of the recording layer is not larger than $\lambda/2\Delta n$, and
wherein a refractive index of each of said first and second dielectric films is different from a refractive index of the substrate.

2. An optical recording medium comprising:
a recording layer including an organic material having its molecular orientation changed on illumination of polarized light;
a substrate on which said recording layer is formed, said substrate having at least one of a guide groove and pits on a side facing to the recording layer;
a first dielectric film formed on said substrate between the substrate and the recording layer;
a second dielectric film formed on said recording layer;
a reflective film formed on said second dielectric film; and
a protective film formed on said reflective film,
wherein with a birefringence $\Delta n$ of the recording layer when oriented completely and with a wavelength $\lambda$ of a playback light, a thickness t of the recording layer is not larger than $\lambda/2\Delta n$, and
wherein a refractive index of each of said first and second dielectric films is different from a refractive index of the substrate.

3. An optical recording medium, comprising:
a recording layer including an organic material having its molecular orientation changed on illumination of polarized light;
a substrate on which the recording layer is formed, said substrate having at least one of a guide groove and pits on a side facing to the recording layer;
a first dielectric film formed on the substrate between the substrate and the recording layer;
a second dielectric film formed on the recording layer; and
a reflective film formed on the second dielectric layer,
wherein with a birefringence $\Delta n$ of said recording layer when oriented completely and with a wavelength $\lambda$ of a playback light, a thickness t of the recording layer is not larger than $\lambda/4\Delta n$ and
a total film thickness of the first and second dielectric films is set so that a phase deviation between reflected light beams of light incident parallel to an axis of an ordinary light of birefringence and light incident parallel to the axis of extraordinary light of birefringence is closest to $\pi$.

4. An optical recording medium, comprising:
a recording layer including an organic material having its molecular orientation changed on illumination of polarized light;
a substrate on which the recording layer is formed, said substrate having at least one of a guide groove and pits on a side facing to the recording layer;
a first dielectric film formed on the substrate between the substrate and the recording layer;
a second dielectric film formed on the recording layer; and
a reflective film formed on the second dielectric layer,
wherein with a birefringence $\Delta n$ of said recording layer when oriented completely and with a wavelength $\lambda$ of a playback light, a thickness t of the recording layer is not larger than $\lambda/8\Delta n$ and
a total film thickness of the first and second dielectric films is set so that a phase deviation between reflected light beams of light incident parallel to an ordinary light of birefringence and light incident parallel to the axis of extraordinary light of birefringence is closest to $\pi/2$.

5. A recording and/or reproducing apparatus for recording on or reproducing from an optical recording medium, said optical recording medium having a recording layer including an organic material having its molecular orientation changed on illumination of polarized light, said apparatus comprising:

a recording optical system for illuminating a pre-set polarized light as recording light on said recording layer; and a reproducing optical system for detecting a polarized state of a playback light incident on said recording layer, wherein a thickness of the recording layer of said optical recording medium is set so that a phase of an output light is shifted approximately $\pi$ between axes of birefringence with respect to that of the incident playback light, and wherein said reproducing optical system is configured for producing different outputs for light incidence in a non-oriented state and light incidence in an oriented state.

6. A recording and/or reproducing apparatus for recording on or reproducing from an optical recording medium, said optical recording medium having a recording layer including an organic material having its molecular orientation changed on illumination of polarized light, said apparatus comprising:

a recording optical system for illuminating a pre-set polarized light as recording light on said recording layer; and a reproducing optical system for detecting a polarized state of a playback light incident on said recording layer, wherein a thickness of the recording layer of said optical recording medium is set so that a phase of an output light is shifted approximately $\pi$ between axes of birefringence with respect to that of the incident playback light, wherein said recording optical system is capable of controlling a direction of molecular orientation of the organic material between 0° and 45°, and wherein said reproducing optical system produces a plurality of different outputs due to an incidence of the playback light on the recording layer depending on the direction of molecular orientation.

7. A recording and/or reproducing apparatus for recording on or reproducing from an optical recording medium, said optical recording medium having a recording layer including an organic material having its molecular orientation changed on illumination of polarized light, said apparatus comprising:

a recording optical system for illuminating a pre-set polarized light as recording light on said recording layer; and a reproducing optical system for detecting a polarized state of a playback light incident on said recording layer, wherein a thickness of the recording layer of said optical recording medium is set so that a phase of an output light is shifted approximately $\pi/2$ between axes of birefringence with respect to that of the incident playback light, wherein said recording optical system is capable of controlling a direction of molecular orientation of the organic material between 0° and 90°, and wherein said reproducing optical system produces different outputs due to an incidence of the playback light on the recording layer depending on the direction of molecular orientation.

* * * * *